Figure 1:
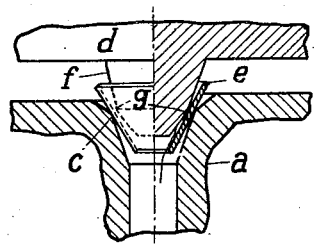

Jan. 5, 1932.  H. PITTLICK  1,839,340

SEAL

Filed Dec. 27, 1928

Inventor:
Hermann Pittlick
by Kirchhauer
Atty.

Patented Jan. 5, 1932

1,839,340

UNITED STATES PATENT OFFICE

HERMANN PITTLICK, OF SODINGEN, GERMANY, ASSIGNOR TO THE FIRM PATENT-VERWERTUNGE A. G. "ALPINA" S. A. POUR L'EXPLOITATION DE BREVETS "ALPINA" PATENTS EXPLOITATION CY. "ALPINA" LTD., OF BASEL, SWITZERLAND

SEAL

Application filed December 27, 1928, Serial No. 328,834, and in Germany February 2, 1927.

My invention relates to seals and more especially to the sealing of covers, stoppers, or valve bodies in the opening, neck or passage of a container, conduit or valve.

In vacuum and compression apparatus the closures or valves are required to ensure an absolutely perfect and efficient sealing. The covers or valves as hitherto designed are as a rule formed with conical cooperating surfaces which are however known to be frequently worn out very soon so as to require being turned or reground in order to avoid leakage.

It is an object of my invention to remedy this defect and with this object in view I provide a separate packing means of annular shape intermediate between the two cooperating surfaces and I impart to these surfaces a configuration such that they constitute two parallel annular sealing lines of projecting rotation bodies. I preferably shape these surfaces to form double cones superposed to form in the planes where the two cones intersect the circular edges or lines mentioned above. However, the cooperating surfaces need not be conical, the invention also comprising any other suitable formation or configuration thereof provided that it provides projecting circular contacting lines, edges or ridges for engagement with the two faces of the sealing member to be inserted therebetween.

Obviously it is not necessary either that the annular contacting lines or edges be absolutely sharp. They may be blunt or obtuse so as to form annular faces for the sealing contact, but it will always be preferable to keep these faces as narrow as possible, their width depending chiefly upon the hardness of the material employed.

In case that the cross-sectional area of the parts have a polygonal configuration, the sealing lines, edges or faces will conform thereto but as in the great majority of cases the cooperating sealing members will, for practical manufacturing reasons, be formed with circular or conical surfaces, the invention will be described particularly with reference to circular-cooperating edges or lines.

I have further found that a particularly reliable and efficient seal will be obtained if the two cooperating circular or annular edges or faces are not located exactly opposite each other with the sealing member or ring between them but are displaced relative to each other. In this case the annular sealing member will be resilient and will act to reduce the required preliminary pressure. The usefulness of displacing the two cooperating circular edges or faces with relation to each other, will depend upon the sealing member or ring remaining unaltered in maintaining its position with regard to the outer rotation body or cone or in respect to the inner rotation body or cone.

In some cases it will be advisable to use a sealing member which is integral with or forms part of a vessel adapted to be inserted in the container or conduit to be closed, and several such vessels may be employed in concentric arrangement, in which case the upper part of the vessels forms the sealing ring, properly speaking, or a rotation body with an annular projecting edge or face on either side so as to constitute a double cone in cross-section.

Figure 4:
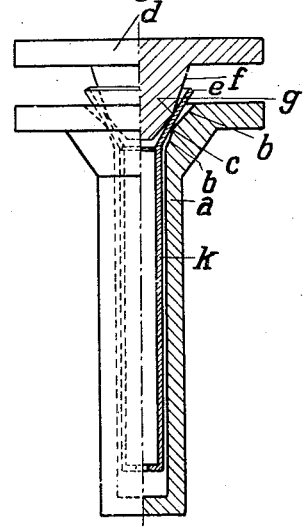
Figure 5:
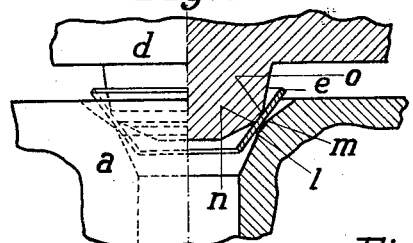
Figure 6:
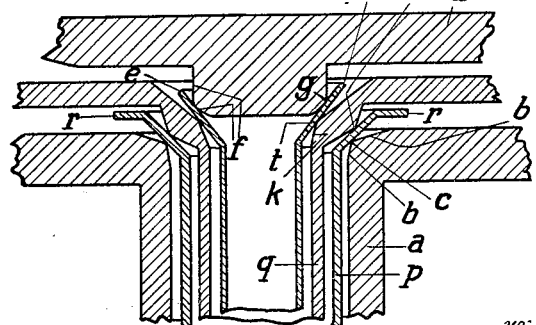

In the drawings affixed to this specification and forming part thereof, several embodiments of my invention are illustrated diagrammatically by way of example as applied to a cylindrical vessel or container and the cover thereof. In the case of valves the valve seat and the valve body or disk will take the place of the top of the vessel and the cover thereof, respectively. In the drawings Fig. 1 is a sectional view, partly in elevation, of an embodiment wherein the edges of the sealing parts are sharp and disposed exactly opposite each other, Fig. 2 is a similar view of an embodiment with the sealing edges displaced, the edge of the vessel lying in a horizontal plane a little above the horizontal plane of the sealing edge of the cover, Fig. 3 is a similar view of an embodiment having rounded convex sealing edges, the circular sealing line of the container lying below the sealing line of the cover, Fig. 4 is a similar view showing a form with sharp sealing edges, the edge of the container being disposed below the sealing edge of the cover and the sealing ring constituting the top of a second container adapted to be inserted into the first one, Fig. 5 shows another form in which the sealing edges of the container and the cover are shaped to form narrow annular faces, the narrow sealing face of the cover lying above the corresponding face of the container, and Fig. 6 is a sectional view of an embodiment including three inserts or containers, two of which are shaped at the top to form sealing rings, while the third one located between the two other ones is shaped to form at the top an annular projecting edge on either side thereof.

Referring first to Fig. 1, the upper end of the container or vessel $a$ is shaped, by turning or in any other appropriate way, to form a flaring orifice composed of two conical surfaces $b$, the one above or in continuation of the other one, so that an angular, annular edge or ridge $c$ is produced in the intersecting plane of the two conical surfaces. The valvular projection of the lid or cover $d$ of the vessel is likewise shaped to form two conical surfaces $f$ with a projecting annular edge or ridge $g$ in the plane of intersection. Prior to assembling the parts $a$ and $d$ a preferably conical sealing ring $e$ is inserted therebetween as shown, the two cooperating edges or ridges $c$ and $g$ contacting with the inner and outer surfaces of the ring in exact opposition.

Figure 2:
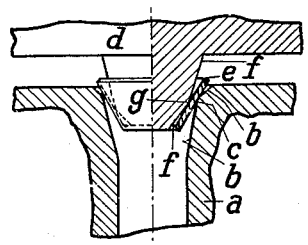

The modification shown in Fig. 2 is in general similar to the one described with reference to Fig. 1. The flaring orifice of the vessel comprises two adjacent conical surfaces $b$ forming an annular edge or ridge $c$ and the valvular projection of the cover $d$ is likewise provided with two conical surfaces $f$ constituting an annular edge or ridge $g$, but the sealing edge $c$ is situated a little above the intruding edge $g$. The sealing ring $e$ is interposed between the two edges.

Figure 3:
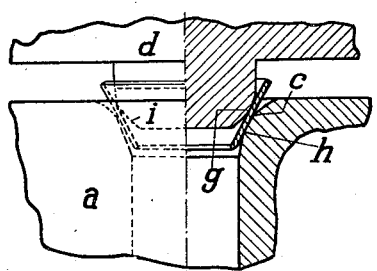

In the modification shown in Fig. 3 the mating surfaces $i$ and $h$ of the vessel and the cover, respectively, are rounded and do not form a sharp edge or ridge. The annular sealing lines are variable in accordance with the position the sealing ring $e$ occupies between the two cooperating surfaces $i$ and $h$. In some cases the sealing line $c$ of the rounded surface $h$ of the vessel will be directly opposite the sealing line $g$ of the rounded surface of the cover, in other cases it may be located either above or below the sealing line $g$. The latter alternative is shown in Fig. 3.

Obviously the invention is also applicable in cases where the sealing member or ring forms a part of an insert or container adapted to be inserted into the vessel or the like, as shown in Fig. 4, or where two or more inserts are to be telescopically assembled and accommodated as a unit in a vessel or apparatus, as illustrated in Fig. 6.

In Fig. 4 I have shown an embodiment similar to the construction illustrated in Fig. 2 and provided with a sealing ring forming a part of an insert. The vessel $a$ has sealing surfaces $b$ and the cover $d$ has a sealing surface $f$, as shown in Fig. 2. The sealing edges or ridges $c$ and $g$ are alike to those shown in Fig. 2, however the sealing edge $c$ lies a little below the sealing edge $g$. Generally speaking, these mutual positions of the sealing edges are preferable. As will be seen in Fig. 4, the sealing ring $e$ forms the top of a container $k$ which is inserted in the vessel $a$.

In the modification shown in Fig. 5 both the sealing surfaces of the vessel $a$ and those of the cover $d$ are shaped to form angular edges. In this case the sealing contact between the orifice of the vessel and the sealing ring, on the one hand, and the cover and the sealing ring, on the other hand, is not effected in a circular line, as in the embodiments shown in Figs. 1 to 4, but occupies narrow annular surfaces, the contacting or sealing surface of the cover being marked $n$, $o$ and that of the vessel $l$, $m$. In Fig. 5 the narrow contacting surface $l$, $m$ of the vessel lies a little below the contacting surface $n$, $o$, that is to say, a little farther within the orifice of the vessel.

In Fig. 6 the orifice of the vessel $a$ is shaped to form two adjacent conical surfaces $b$ constituting a sharp sealing edge or ridge $c$, and similarly the projecting part of the cover $d$ is provided with two annular intersecting surfaces $f$ constituting a sharp sealing edge or ridge $g$. Three inserts are accommodated in the vessel, the innermost insert $k$ having a flaring top forming a sealing ring $e$ and the outermost insert $p$ being similarly shaped to form, at the top thereof, a sealing ring $r$, while the third insert $q$ disposed between the two inserts $k$ and $p$ is shaped at the top to provide two inner intersecting conical surfaces constituting a sealing edge or ridge $t$ opposite the edge $g$ of the cover, and two outer intersecting conical surfaces constituting a sealing edge or ridge $v$. It will be seen that the sealing effect is accomplished in this modification, taken singly, in the very same manner as described with reference to Figs. 1, 2 or 4.

If it is desired or preferred not to use an intermediate container such as $q$, the depending part thereof which forms the container properly speaking, may be dispensed with, while the upper part forming an annular sealing member or ring will be useful for the sealing purpose as above described.

All of the several embodiments shown and described herein are adapted for use in connection with both vacuum apparatus and compression apparatus, but they are particularly suited for sealing apparatus in which very high pressures are employed, and they are particularly efficient and advantageous in connection with apparatus in which the sealing members are frequently disengaged and reconnected such as in valves and the like.

In the claims the term "edge" is meant to include blunt and rounded faces.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Seal comprising a body with a funnel-shaped opening to be sealed and a conical closing body cooperating therewith to seal same, projecting annular edges being formed on adjoining faces of the cooperating parts, the said edges being parallelly related to each other, and a sealing member inserted between the cooperating parts to be engaged by both said edges.

2. Seal comprising a body with a funnel-shaped opening to be sealed and a conical closing body cooperating therewith to seal same, projecting annular edges being formed on adjoining faces of the cooperating parts, the said edges being disposed in the same plane and parallelly related to each other, and a sealing member inserted between the cooperating parts to be engaged by both said edges.

3. Seal comprising a body with a funnel-shaped opening to be sealed and a conical closing body cooperating therewith to seal same, projecting annular edges being formed on adjoining faces of the cooperating parts, the said edges being disposed in different planes parallelly related to each other, and a funnel-shaped sealing member inserted between the cooperating parts to be engaged by both said edges.

4. Seal comprising a body with a funnel-shaped opening to be sealed and a conical closing body cooperating therewith to seal same, a projecting annular edge being formed on each of the cooperating parts, the said edges being parallelly related to each other, and a funnel-shaped sealing member inserted between the cooperating parts to be engaged by both said edges.

5. Seal comprising a body with a funnel-shaped opening to be sealed and a conical closing body cooperating therewith to seal same, a projecting annular edge being formed on each of the cooperating parts, the said edges being parallelly related to each other, and a sealing member inserted between the cooperating parts to be engaged by both said edges, said sealing member having the form of a container, the funnel-shaped top part of which is engaged by the cooperating edges.

6. Seal comprising a body with a funnel-shaped opening to be sealed and a conical closing body cooperating therewith to seal same, a projecting annular edge being formed on each of the cooperating parts, the said edges being parallelly related to each other, and a funnel-shaped sealing member inserted between the cooperating parts to be engaged by both said edges, said sealing member being also formed with a projecting annular edge.

7. Seal comprising a body with a funnel-shaped opening to be sealed and a conical closing body cooperating therewith to seal same, a projecting annular edge being formed on each of the cooperating parts, the said edges being parallelly related to each other, and a funnel-shaped sealing member inserted between the cooperating parts to be engaged by both said edges, said sealing member being also formed with a projecting annular edge on either side thereof.

8. Seal comprising a body with a funnel-shaped opening to be sealed and a conical closing body cooperating therewith to seal same, a projecting annular edge being formed on each of the cooperating parts by two intersecting conical surfaces, the said edges being parallelly related to each other, and a funnel-shaped sealing member inserted between the cooperating parts to be engaged by both said edges.

In testimony whereof I affix my signature.

HERMANN PITTLICK.